(12) United States Patent
Ishii et al.

(10) Patent No.: US 11,168,778 B2
(45) Date of Patent: Nov. 9, 2021

(54) VEHICLE TRANSMISSION STRUCTURE

(71) Applicant: HONDA MOTOR CO., LTD., Tokyo (JP)

(72) Inventors: Naoki Ishii, Wako (JP); Yoshihiko Muneno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/666,519

(22) Filed: Oct. 29, 2019

(65) Prior Publication Data
US 2020/0200254 A1 Jun. 25, 2020

(30) Foreign Application Priority Data

Dec. 21, 2018 (JP) .............................. JP2018-239365

(51) Int. Cl.
*F16H 57/00* (2012.01)
*F16H 3/08* (2006.01)
(Continued)

(52) U.S. Cl.
CPC .......... *F16H 57/0006* (2013.01); *F16H 3/08* (2013.01); *F16H 55/14* (2013.01); *F16K 31/44* (2013.01);
(Continued)

(58) Field of Classification Search
CPC ........ F16H 57/0006; F16H 3/08; F16H 55/14; F16H 2057/02065; F16H 2063/3079; F16K 31/44; B60Y 2200/12
See application file for complete search history.

(56) References Cited

U.S. PATENT DOCUMENTS

| 8,327,970 | B2 * | 12/2012 | Furuse | B62K 11/06 180/336 |
| 9,052,007 | B2 | 6/2015 | Lai | |

(Continued)

FOREIGN PATENT DOCUMENTS

| CN | 103244666 | 8/2013 |
| JP | 58-187647 | 12/1983 |

(Continued)

OTHER PUBLICATIONS

Indian Office Action for Indian Patent Application No. 201914045289 dated Oct. 23, 2020.
(Continued)

*Primary Examiner* — Zakaria Elahmadi
(74) *Attorney, Agent, or Firm* — Amin, Turocy & Watson, LLP

(57) ABSTRACT

A vehicle transmission structure of an embodiment includes a shift drum which rotates in accordance with a shift operation; a bearing member which rotatably supports the shift drum with respect to a transmission case; a set member which positions the bearing member; a shift fork shaft supported by the transmission case; and a shift fork supported by the shift fork shaft to be movable in an axial direction. An end portion of the shift fork shaft is movably fitted to an insertion hole provided in the transmission case, a cap is provided at an end portion of the shift fork shaft, a first gap is provided between an end surface of the insertion hole and the cap, the set member is disposed at a position overlapping the insertion hole when viewed in the axial direction, and a second gap is provided between an end surface of the insertion hole and the set member.

5 Claims, 7 Drawing Sheets

(51) Int. Cl.
 *F16H 55/14* (2006.01)
 *F16K 31/44* (2006.01)
 F16H 63/30 (2006.01)
 F16H 57/02 (2012.01)

(52) U.S. Cl.
 CPC . *B60Y 2200/12* (2013.01); *F16H 2057/02065* (2013.01); *F16H 2063/3079* (2013.01)

(56) References Cited

U.S. PATENT DOCUMENTS

| | | | |
|---|---|---|---|
| 10,544,863 B2* | 1/2020 | Takahashi | F16H 63/18 |
| 2005/0085329 A1* | 4/2005 | Kawakubo | F16H 57/02 |
| | | | 475/219 |
| 2006/0293104 A1* | 12/2006 | Watanabe | F16H 57/02 |
| | | | 464/68.41 |
| 2009/0205455 A1* | 8/2009 | Kosugi | F16H 63/18 |
| | | | 74/473.21 |
| 2011/0239805 A1* | 10/2011 | Fujimoto | F16H 63/18 |
| | | | 74/473.12 |
| 2012/0298466 A1* | 11/2012 | Nedachi | F16D 48/06 |
| | | | 192/84.6 |
| 2013/0081492 A1* | 4/2013 | Hedman | F16H 3/006 |
| | | | 74/335 |
| 2014/0090499 A1* | 4/2014 | Fernandez | F16H 59/0208 |
| | | | 74/335 |
| 2017/0227125 A1* | 8/2017 | Fujimoto | F16H 63/18 |
| 2017/0254414 A1* | 9/2017 | Kittaka | F16H 61/0437 |
| 2017/0268654 A1* | 9/2017 | Makita | F16H 55/14 |
| 2017/0268670 A1* | 9/2017 | Fujimoto | F16H 61/32 |

FOREIGN PATENT DOCUMENTS

| | | |
|---|---|---|
| JP | 3481224 | 12/2003 |
| JP | 2013-194849 | 9/2013 |
| JP | 2017-172601 | 9/2017 |

OTHER PUBLICATIONS

Japanese Notice of Allowance for Japanese Patent Application No. 2018-239365 dated Sep. 29, 2020.

\* cited by examiner

VEHICLE TRANSMISSION STRUCTURE

CROSS-REFERENCE TO RELATED APPLICATION

Priority is claimed on Japanese Patent Application No. 2018-239365, filed Dec. 21, 2018, the content of which is incorporated herein by reference.

BACKGROUND

Field of the Invention

The present invention relates to a vehicle transmission structure.

Description of Related Art

In the related art, in a vehicle transmission structure, a structure equipped with a shift drum that rotates in accordance with a shift operation, a shift fork shaft supported by a transmission case, and a shift fork shaft supported by the shift fork shaft to be axially movable by rotation of the shift drum is known. For example, Japanese Unexamined Patent Application, First Publication No. 2017-172601, a damper member is provided at an end portion of the shift fork shaft. The end portion of the shift fork shaft is fitted into a bottomed boss portion provided on a crankcase.

SUMMARY

However, in the case of the structure in which the end portion of the shift fork shaft is fitted to the bottomed boss portion, when the shift fork shaft moves in an axial direction, there is a risk of the following problems. When there is air or oil between the end portion of the shift fork shaft and a bottom portion of the boss portion, the movement of the shift fork shaft in the axial direction is disturbed, which may affect a smooth shifting operation of the transmission.

The present invention is to perform a smooth shift operation of a transmission in a vehicle transmission structure.

SUMMARY OF THE INVENTION

A vehicle transmission structure according to the present invention employs the following configuration.

(1) A vehicle transmission structure according to the present invention including: a shift drum which rotates in accordance with a shift operation; a bearing member which rotatably supports the shift drum with respect to a transmission case; a set member which positions the bearing member; shift fork shafts supported by the transmission case; and shift forks supported by the shift fork shafts to be movable in an axial direction by rotation of the shift drum, in which an end portion of the shift fork shaft is movably fitted to an insertion hole provided in the transmission case, a damper member is provided at an end portion of the shift fork shaft, a first gap is provided between an end surface of the insertion hole and the damper member, the set member is disposed at a position overlapping the insertion hole when viewed in the axial direction, and a second gap is provided between an end surface of the insertion hole and the set member.

(2) In the above mentioned aspect of (1), the transmission case may be a structure divided into upper and lower parts including an upper case and a lower case, the shift fork shafts may be disposed parallel to mating surfaces of the upper case and the lower case, a first end portion of the shift fork shaft may be movably fitted to the insertion hole, a first damper member may be provided at a first end portion of the shift fork shaft, a second end portion of the shift fork shaft may be fitted to a bottomed boss portion provided in the transmission case, and a second damper member may be provided at the second end portion of the shift fork shaft.

(3) In the aspect of above mentioned (1) or (2), the set member may be formed in an annular shape or a C shape, a plurality of shift fork shafts may be provided around the shift drum, and the set member may be disposed to overlap end portions of the plurality of shift fork shafts when viewed in the axial direction, and may be formed of a single member.

(4) In the aspect of any one of above mentioned (1) to (3), an end portion of the shift fork shaft may be exposed from the set member when viewed in the axial direction.

(5) In the aspect of any one of above mentioned (2) to (4), a through hole penetrating a side of the second end portion of the shift fork shaft and the outside of the transmission case may be provided in the bottomed boss portion provided in the transmission case.

According to the above mentioned aspect of (1), the first gap is provided between the end surface of the insertion hole and the damper member, and the second gap is provided between the end surface of the insertion hole and the set member. Thus, the following effects are exhibited. When the shift fork shaft moves in the axial direction, since air or oil present in the first gap flows outward through the second gap, the axial movement of the shift fork shaft can be promoted. Therefore, a smooth shift operation of the transmission can be performed. In addition, since the set member is disposed at a position overlapping the insertion hole when viewed in the axial direction, the position restriction of the shift fork shaft in the axial direction can be performed by the set member shared for the positioning of the bearing member. This contributes to a reduction in the number of components. In addition, since the damper member is provided at the end portion of the shift fork shaft, it is possible to curb an occurrence of a hitting sound due to a direct collision between the end portion of the shift fork shaft and the set member.

According to the above mentioned aspect of (2), when the shift fork shaft is assembled to the transmission case having a structure divided into upper and lower parts by fitting the second end portion of the shift fork shaft to the bottomed boss portion provided in the transmission case, the shift fork shaft inserted from the insertion hole can be easily fixed. In addition, since the insertion hole is blocked by the set member, it is possible to easily perform the position restriction of the shift fork shaft in the axial direction. In addition, since the second damper member is provided at the second end portion of the shift fork shaft, it is possible to suppress occurrence of hitting sound due to a direct collision between the second end portion of the shift fork shaft and the bottom portion of the boss portion.

According to the above mentioned aspect of (3), since the set member is disposed to overlap the end portions of the plurality of shift fork shafts when viewed in the axial direction, and is formed of a single member, the position restriction of the plurality of shift fork shafts in the axial direction can be performed by the single set member, which contributes to a reduction in the number of components.

According to the above mentioned aspect of (4), since the end portion of the shift fork shaft is exposed from the set member when viewed in the axial direction, the escape of air or oil is further improved.

According to the above mentioned aspect of (5), a through hole penetrating a side of the second end portion of the shift fork shaft and the outside of the transmission case is provided in the bottomed boss portion provided in the transmission case. Thus, when the shift fork shaft moves in the axial direction toward the boss portion, since air or oil can be allowed to flow to the outside through the through hole, it is possible to further promote the movement of the shift fork shaft in the axial direction.

DETAILED DESCRIPTION OF THE INVENTION

Figure 1:
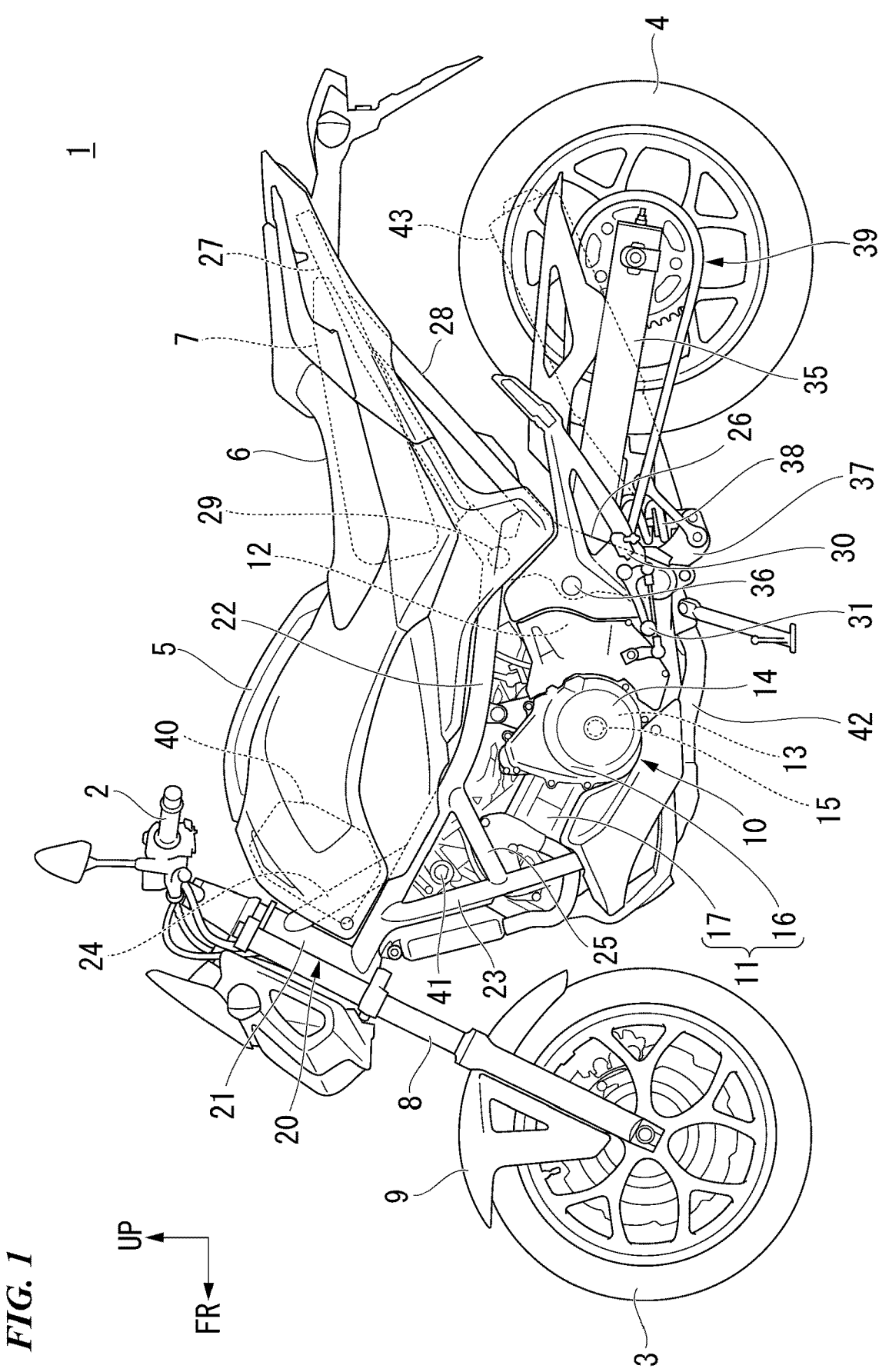
FIG. 1 is a left side view of a motorcycle according to an embodiment.

Hereinafter, embodiments of the present invention will be described with reference to the drawings. Directions such as forward, rearward, left and right in the following description are the same as those in a vehicle described below unless otherwise specified. In addition, an arrow FR indicating a front side of the vehicle, an arrow LH indicating a left side of the vehicle, and an arrow UP indicating an upper side of the vehicle are shown in appropriate places in the drawings used for the following description.
<Whole Vehicle>

FIG. 1 shows a motorcycle 1 as an example of a saddle riding type vehicle. Referring to FIG. 1, the motorcycle 1 is equipped with a front wheel 3 that is steered by a bar type handlebar 2, and a rear wheel 4 that is driven by a power unit 10 including an engine 11. Hereinafter, the motorcycle may be simply referred to as a "vehicle".

Steering system components including the handlebar 2 and the front wheel 3 are supported by a head pipe 21 formed at a front end portion of a vehicle body frame 20 which is steerable. A handle steering shaft (not shown) connected to the handlebar 2 is inserted through the head pipe 21. A power unit 10 is disposed at a front-rear center portion of the vehicle body frame 20.

For example, the vehicle body frame 20 is formed by integrally joining steel bodies of a plurality of types by welding or the like. The vehicle body frame 20 is equipped with a head pipe 21, a main frame 22, a down frame 23, a front stay 24, a side stay 25, a pivot frame 26, a seat rail 27, and a rear stay 28.

The head pipe 21 is inclined so that an upper end of the head pipe 21 is located rearward and a lower end of the head pipe 21 is located forward.

The main frame 22 connects the head pipe 21 and the pivot frame 26. A pair of left and right main frames 22 are provided to extend obliquely rearward and downward from a lower portion of the head pipe 21.

A pair of left and right down frames 23 are provided to extend obliquely rearward and downward from the front end portion of the main frame 22 with a steeper slope than the main frames 22.

A pair of left and right front stays 24 are provided to extend obliquely rearward and downward from the upper portion of the head pipe 21. A rear end of the front stay 24 is joined to the main frame 22 behind a connecting portion between the main frame 22 and the down frame 23.

A pair of left and right side stays 25 are provided to extend obliquely rearward and upward from the down frame 23. A rear end of the side stay 25 is joined to the main frame 22 behind the connecting portion between the main frame 22 and the front stay 24.

A pair of left and right pivot frames 26 are provided to extend downward from the rear end portion of the main frame 22. The upper portions of the left and right pivot frames 26 are connected to each other by a cross member 29 extending in a vehicle width direction.

A pair of left and right seat rails 27 are provided to extend obliquely rearward and upward from the rear end portion of the main frame 22.

The rear stay 28 connects the upper portion of the pivot frame 26 and the rear portion of the seat rail 27. A pair of left and right rear stays 28 are provided to extend obliquely rearward and upward from the upper portion of the pivot frame 26.

The power unit 10 is disposed below the main frame 22. The power unit 10 is disposed in a region surrounded by the main frame 22, the down frame 23, and the pivot frame 26. The power unit 10 is supported on the vehicle body frame 20 by a plurality of hangers. The power unit 10 is equipped with an engine 11, a transmission 12 (see FIG. 2), and a generator 13.

The engine 11 is a power source of the vehicle. The engine 11 is equipped with a crankshaft 15 extending in the vehicle width direction. For example, the engine 11 is a multi-cylinder engine. The engine 11 is equipped with a crankcase 16 that accommodates the crankshaft 15, and a cylinder 17 that stands obliquely forward and upward from the upper portion of the crankcase 16. The cylinder 17 is integrally joined to the upper portion of the crankcase 16. An oil pan 18 is joined to the lower portion of the crankcase 16 (see FIG. 2).

Figure 2:
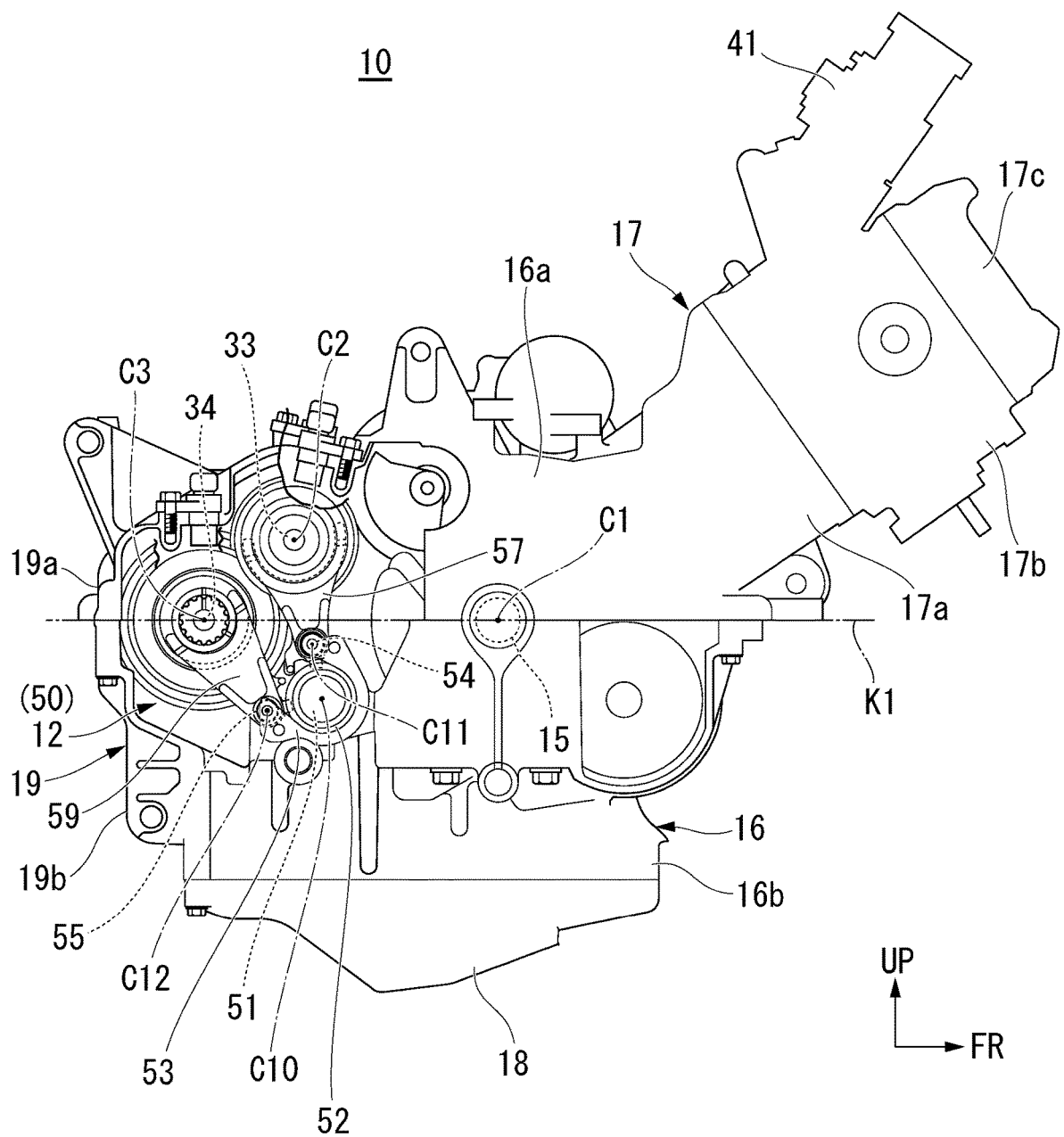
FIG. 2 is a right side view of a power unit of the embodiment.

As shown in FIG. 2, the crankcase 16 is equipped with an upper case 16a and a lower case 16b that are divided vertically. The transmission 12 is provided at the rear portion of the crankcase 16. The rear portion of the crankcase 16 also serves as a transmission case 19 that accommodates the clutch and transmission. The transmission 12 is equipped with an output shaft (not shown) for extracting the power of the engine 11 to the outside.

The transmission case 19 has a structure divided into upper and lower parts including an upper case 19a and a lower case 19b. The upper case 19a of the transmission case 19 constitutes the rear portion of the upper case 16a of the crankcase 16. The lower case 19b of the transmission case 19 constitutes the rear portion of the lower case 16b of the crankcase 16. Mating surfaces of the upper case 19a and the lower case 19b are substantially parallel to a horizontal plane. Reference numeral K1 in the drawing denotes a virtual straight line passing through the mating surfaces of the upper case 19a and the lower case 19b.

The generator 13 (see FIG. 1) generates power using the rotation of the engine 11. The generator 13 is connected to a left end portion of the crankshaft 15 in the vehicle width direction. As shown in FIG. 1, a cover member 14 that covers the generator 13 from the outside in the vehicle width direction is joined to a left side portion of the crankcase 16. Although not shown, the generator 13 is equipped with a stator fixed to the cover member 14 and an outer rotor provided on the crankshaft 15.

A front end portion of a swing arm 35 is supported on the left and right pivot frames 26 to be swingable via a support shaft 36. A link mechanism including a link member 37 is provided between the front lower portion of the swing arm 35 and the lower portion of the pivot frame 26. A rear suspension 38 is interposed between the link member 37 and the cross member 29. An axle of the rear wheel 4 is supported at the rear portion of the swing arm 35. The output shaft of the transmission 12 and the axle of the rear wheel 4 are connected to each other via a power transmission mechanism 39 (for example, a chain transmission mechanism) including a drive chain and the like.

A storage box 5 is mounted on the main frame 22. A seat 6 for a passenger to sit on is provided behind the storage box 5. The seat 6 is mounted on the seat rail 27 to be openable and closable. A fuel tank 7 is disposed below the seat 6.

As shown in FIG. 2, the cylinder 17 is equipped with a cylinder block 17a joined to the front upper end of the crankcase 16, a cylinder head 17b joined to the upper end of the cylinder block 17a, and a head cover 17c joined to the upper end of the cylinder head 17b. An air cleaner 40 supported by the front stay 24 is disposed above the cylinder head 17b (see FIG. 1).

As shown in FIG. 1, an upstream end of an intake pipe (not shown) for supplying air (outside air) to the engine 11 is connected to the air cleaner 40. A throttle body 41 in which a throttle valve is embedded is interposed between a downstream end of the intake pipe and the upper portion (the rear portion) of the cylinder head 17b, (see FIG. 2).

An upstream end of an exhaust pipe 42 for discharging the exhaust of the engine 11 is connected to the lower portion (the front portion) of the cylinder head 17b. A muffler 43 is connected to a downstream end (the rear end) of the exhaust pipe 42.

In FIG. 1, reference numeral 30 denotes a left step for an occupant to put his foot on. A change pedal 31 for performing a shift operation of the transmission (the transmission 12) is provided in front of the left step 30. In FIG. 1, reference numeral 8 denotes a front fork, and reference numeral 9 denotes a front fender, respectively.

<Vehicle Transmission Structure>

Figure 4:
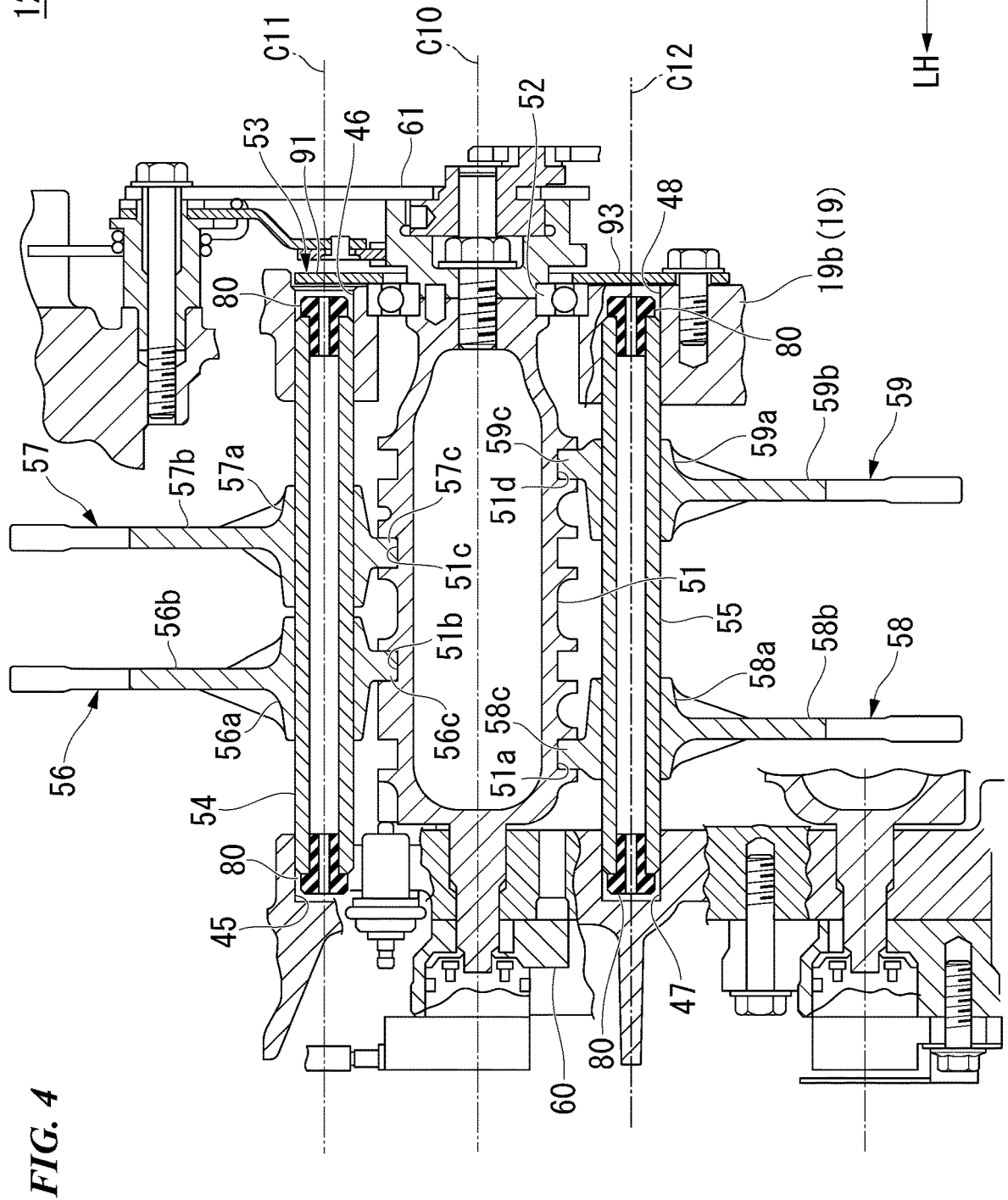
FIG. 4 is a developed cross-sectional view of a vehicle transmission structure of the embodiment.

FIG. 4 is a developed cross-sectional view of the vehicle transmission structure 50 according to the embodiment.

As shown in FIG. 4, the vehicle transmission structure 50 is equipped with a shift drum 51 that rotates in accordance with the shift operation, a bearing member 52 that rotatably supports the shift drum 51 with respect to the transmission case 19, a set member 53 that positions the bearing member 52, shift fork shafts 54 and 55 supported by the transmission case 19, and shift forks 56, 57, 58 and 59 supported by the shift fork shafts 54 and 55 to be movable in the axial direction by rotation of the shift drum 51.

In FIG. 2, reference numeral C1 denotes a central axis of the crankshaft 15 (hereinafter referred to as a "crank axis"), reference numeral C2 denotes a central axis of the main shaft 33 (hereinafter referred to as a "main axis"), and reference numeral C3 denotes a central axis of the countershaft 34 (hereinafter referred to as a "counter axis"), respectively. Each of the crankshaft 15, the main shaft 33, and the countershaft 34 extends in the vehicle width direction. Each of the crankshaft 15, the main shaft 33, and the countershaft 34 are disposed substantially parallel to each other.

As shown in FIG. 2, the main axis C2 is located between the crank axis C1 and the counter axis C3. The main axis C2 is located on the side above and in front of the counter axis C3. The counter axis C3 is located behind the crank axis C1 on the virtual straight line K1. Each of the crank axis C1, the main axis C2, and the counter axis C3 is disposed to be located at an apex of a triangle having one side on the virtual straight line K1.

The main shaft 33 is disposed coaxially with a clutch mechanism (not shown). The power of the crankshaft 15 is transmitted to the main shaft 33 via a clutch mechanism. The power transmitted to the main shaft 33 is decelerated at a predetermined reduction ratio via a transmission gear group (not shown) provided on each of the main shaft 33 and the countershaft 34, and is transmitted to the countershaft 34.

For example, the transmission gear group is a so-called constant meshing type which includes gears corresponding to the number of shift stages each attached to the shafts 33 and 34, and in which the corresponding respective gears are always meshed between both the shafts 33 and 34. Each gear attached to both the shafts 33 and 34 includes a free gear that can freely rotate with respect to the shaft, and a slide gear that is spline-fitted to the shaft. Further, by causing an arbitrary slide gear to slide from a neutral state of the transmission (a state in which the power transmission is not performed between the main shaft 33 and the countershaft 34), the rotation of the free gears to be paired is restricted. As a result, power is transmitted from the main shaft 33 to the countershaft 34 at a predetermined reduction ratio corresponding to each shift stage.

As shown in FIG. 4, the shift drum 51 is rotatably supported by the transmission case 19 via a bearing member 52. A plurality of (for example, four in this embodiment) cam grooves 51a, 51b, 51c and 51d are formed on the outer periphery of the shift drum 51. The four cam grooves 51a, 51b, 51c and 51d are disposed at intervals in the vehicle width direction. The four cam grooves 51a, 51b, 51c and 51d are also referred to as a "first cam groove 51a", a "second cam groove 51b", a "third cam groove 51c", and a "fourth cam groove 51d" in order from the left side.

In the drawing, reference numeral C10 denotes a central axis of the shift drum 51 (hereinafter referred to as a "drum axis"), reference numeral 60 denotes a drum center fixed to a left end portion of the shift drum 51, and reference numeral 61 denotes a stopper plate fixed to a right end portion of the shift drum 51, respectively. The drum axis C10 is substantially parallel to the crank axis C1 (see FIG. 2).

A plurality (for example, two in this embodiment) of shift fork shafts 54 and 55 are provided around the shift drum 51. Hereinafter, one of the two shift fork shafts 54 and 55 is also referred to as a "first shaft 54" and the other thereof is also referred to as a "second shaft 55". Each of the first shaft 54 and the second shaft 55 extends in the vehicle width direction. Each of the first shaft 54 and the second shaft 55 is substantially parallel to the drum axis C10.

The vehicle transmission structure 50 is equipped with a plurality of (for example, two in the present embodiment) shift forks 56 and 57 (hereinafter referred to as "main side forks 56 and 57") extending from the first shaft 54 toward the main shaft 33 (see FIG. 2), and a plurality of (for example, two in this embodiment) shift forks 58 and 59 (hereinafter referred to as "counter side forks 58 and 59") extending from the second shaft 55 toward the countershaft 34 (see FIG. 2).

In FIG. 4, the two main side forks 56 and 57 are disposed at intervals in the vehicle width direction. Hereinafter, a left side of the two main side forks 56 and 57 is also referred to as a "first main side fork 56", and a right side thereof is also referred to as a "second main side fork 57".

The two counter side forks 58 and 59 are disposed at intervals in the vehicle width direction. Hereinafter, a left side of the two counter side forks 58 and 59 is also referred to as a "first counter side fork 58", and a right side thereof is also referred to as a "second counter side fork 59".

The first main side fork 56 is equipped with a cylinder portion 56a through which the first shaft 54 is inserted, a fork portion 56b extending from the outer periphery of the cylinder portion 56a toward the main shaft 33 (see FIG. 3) and bifurcated, and a sliding portion 56c that protrudes to the outer periphery of the cylinder portion 56a and engages with the second cam groove 51b of the shift drum 51.

In the drawing, reference numerals 57a, 57b, and 57c denote a cylinder portion, a fork portion, and a sliding portion in the second main side fork 57, respectively. The sliding portion 57c of the second main side fork 57 engages with the third cam groove 51c of the shift drum 51.

The first counter side fork 58 is equipped with a cylinder portion 58a through which the second shaft 55 is inserted, a fork portion 58b extending from the outer periphery of the cylinder portion 58a toward the countershaft 34 (see FIG. 3) and bifurcated, and a sliding portion 58c that protrudes to the outer periphery of cylinder portion 58a and engages with the first cam groove 51a of the shift drum 51.

In the drawing, reference numerals 59a, 59b, and 59c denote a cylinder portion, a fork portion, and a sliding portion in the second counter side fork 59, respectively. The sliding portion 59c of the second counter side fork 59 engages with the fourth cam groove 51d of the shift drum 51.

Figure 5:
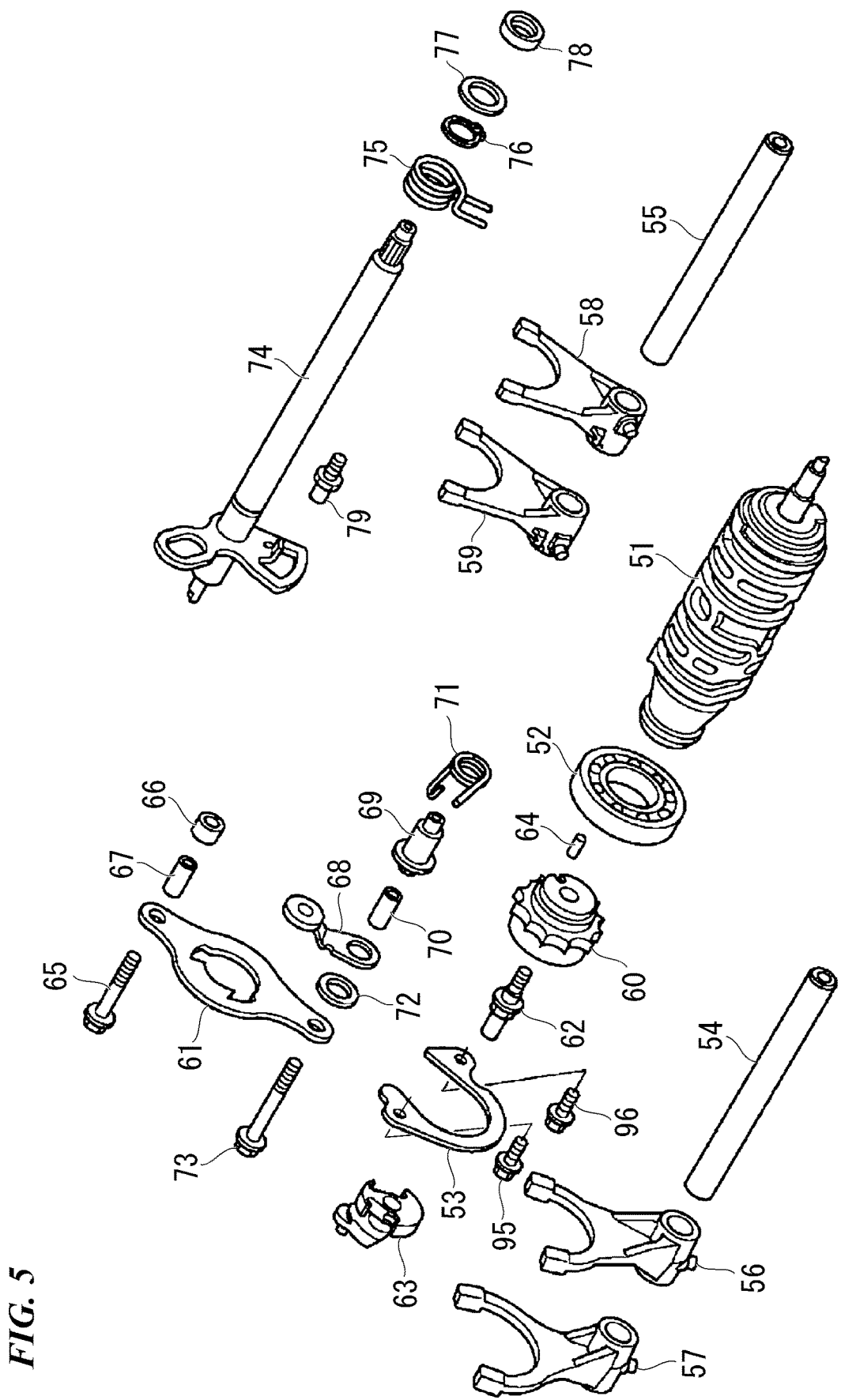
FIG. 5 is an exploded perspective view of the vehicle transmission structure according to the embodiment.

FIG. 5 is an exploded perspective view of a vehicle transmission structure 50 according to the embodiment.

In the drawing, reference numeral 62 denotes a pin shifter disposed coaxially with the drum center 60, reference numeral 63 denotes a drum shifter for supporting the pin shifter 62, reference numeral 64 denotes a pin provided on the drum center 60, reference numeral 65 denotes a first bolt for fixing a stopper plate 61 to a right end portion of the shift drum 51, reference numeral 66 denotes a collar disposed between the stopper plate 61 and a right end portion of the shift drum 51, reference numeral 67 denotes a collar support portion for supporting the collar 66, reference numeral 68 denotes a drum stopper disposed on a side inward from the stopper plate 61 in the axial direction, reference numeral 69 denotes a stopper collar disposed on an inner side of the drum stopper 68 in the axial direction, reference numeral 70 denotes a stopper collar support portion for supporting the stopper collar 69, reference numeral 71 denotes a spring engaged with the stopper collar 69, reference numeral 72 denotes a side collar disposed between the stopper plate 61 and the drum stopper 68 in the axial direction, reference numeral 73 denotes a second bolt for fixing the stopper plate 61 and the drum stopper 68, reference numeral 74 denotes a gear shift spindle linked to the change pedal 31 (see FIG. 1), reference numeral 75 denotes a gear shift spring engaged with an end portion of the gear shift spindle 74, reference numeral 76 denotes a circlip disposed coaxially with the gear shift spindle 74, reference numeral 77 denotes a washer, reference numeral 78 denotes an oil seal, and reference numeral 79 denotes a gear shift pin engaged with the gear shift spring 75, respectively.

For example, when the shift drum 51 rotates, the shift forks 56, 57, 58 and 59 move in the axial direction of the shift fork shafts 54 and 55 along the patterns of the respective cam grooves 51a, 51b, 51c and 51d (see FIG. 4) of the shift drum 51, and cause a predetermined slide gear of the transmission gear group to slide.

Specifically, when the shift drum 51 rotates, the first counter side fork 58 moves in the axial direction of the second shaft 55 along the pattern of the first cam groove 51a (see FIG. 4) of the shift drum 51. When the shift drum 51 rotates, the first main side fork 56 moves in the axial direction of the first shaft 54 along the pattern of the second cam groove 51b (see FIG. 4) of the shift drum 51. When the shift drum 51 rotates, the second main side fork 57 moves in the axial direction of the first shaft 54 along the pattern of the third cam groove 51c (see FIG. 4) of the shift drum 51. When the shift drum 51 rotates, the second counter side fork 59 moves in the axial direction of the second shaft 55 along the pattern of the fourth cam groove 51d (see FIG. 4) of the shift drum 51.

As shown in FIG. 4, each of the first shaft 54 and the second shaft 55 is a hollow shaft (a cylinder) extending in the vehicle width direction. Each of the first shaft 54 and the second shaft 55 is disposed in parallel with the mating surfaces (surfaces including the virtual straight line K1) of the upper case 19a and the lower case 19b (see FIG. 2).

In the drawing, reference numeral C11 denotes a central axis of the first shaft 54 (hereinafter referred to as a "first shaft axis"), and reference numeral C12 denotes a central axis of the second shaft 55 (hereinafter referred to as a "second shaft axis"), respectively. As shown in FIG. 2, the first shaft axis C11 is located above the drum axis C10. The second shaft axis C12 is located behind the drum axis C10.

The first shaft axis C11 is located on the front upper side of the second shaft axis C12.

As shown in FIG. 4, the left end portion of the first shaft 54 is accommodated in a recessed portion 45 provided in the left side portion of the transmission case 19. A right end portion (a first end portion) of the first shaft 54 is movably fitted to an insertion hole 46 (hereinafter also referred to as a "first insertion hole 46") provided in the right side portion of the transmission case 19.

A left end portion (a second end portion) of the second shaft 55 is fitted to a bottomed boss portion 47 provided in the left side portion of the transmission case 19. A right end portion of the second shaft 55 is movably fitted to an insertion hole 48 (hereinafter also referred to as a "second insertion hole 48") provided in the right side portion of the transmission case 19.

A rubber cap 80 (a damper member) is fitted to both end portions of each of the first shaft 54 and the second shaft 55. Hereinafter, in each of the shafts 54 and 55, the cap 80 provided at the right end portion is referred to as a "first cap 80 (a first damper member)", and the cap 80 provided at the left end portion is referred to as a "second cap 80 (a second damper member)".

Figure 6:
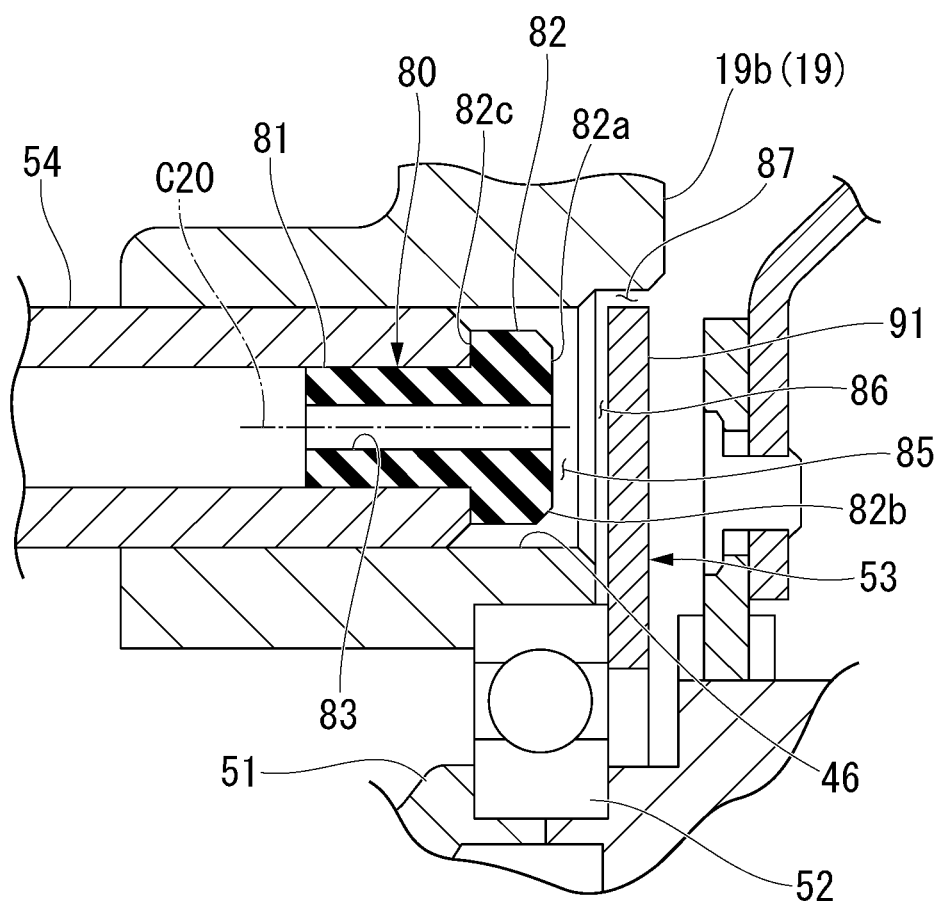
FIG. 6 is an enlarged view of a main part of FIG. 4, showing the peripheral structure of the set member of the embodiment.

As shown in FIG. 6, the cap 80 is equipped with a cylindrical shaft portion 81 press-fitted into an inner peripheral surface of the shift fork shaft (the right end portion of the first shaft 54 in the drawing), and a head portion 82 formed integrally at one end portion of the shaft portion 81. Reference numeral C20 in the drawing denotes a central axis extending in the axial direction of the cap 80 (hereinafter referred to as a "cap axis").

The cap 80 is provided with a through hole 83 that opens in the axial direction to allow the inside and the outside of the shift fork shaft to communicate with each other when the cap 80 is fitted to the shift fork shaft (the first shaft 54 in the drawing). The through hole 83 is formed at a position overlapping the cap axis C20.

The head portion 82 is equipped with a tapered portion 82b that gradually tapers toward a tip end surface 82a of the head portion 82, and an abutment surface 82c that abuts on the end surface of the shift fork shaft.

Referring to FIG. 4, for example, when the second cap 80 of the left end portion of the first shaft 54 abuts on the bottom surface of the recessed portion 45 of the left side portion of the transmission case 19, air or oil accumulated in the recessed portion 45 can be discharged into the first shaft 54 from the through hole 83 of the second cap 80 (the cap 80 on the abutment side). Alternatively, air or oil in the first shaft 54 can be discharged from the through hole 83 of the first cap 80 (the cap 80 on a side opposite to the abutment side) to the first insertion hole 46 of the right side portion of the transmission case 19.

For example, when the second cap 80 of the left end portion of the second shaft 55 abuts on the bottom surface of the boss portion 47 of the left side portion of the transmission case, the air or oil accumulated in the boss portion 47 can be discharged from the through hole 83 of the second cap 80 (the cap 80 on the abutment side) into the second shaft 55. Alternatively, the air or oil in the second shaft 55 can be discharged from the through hole 83 of the first cap 80 (the cap 80 on the side opposite to the abutment side) to the second insertion hole 48 of the right side portion of the transmission case 19.

As shown in FIG. 6, a first gap 85 is provided between the end surface of the first insertion hole 46 and the first cap 80 of the right end portion of the first shaft 54. The end surface of the first insertion hole 46 means a right end surface of a portion (a tubular portion) that forms the first insertion hole 46 in the right side portion of the transmission case 19. The set member 53 is disposed at a position overlapping the first insertion hole 46 when viewed in the axial direction (see FIG. 3).

A second gap 86 is provided between the end surface of the first insertion hole 46 and the set member 53. When the first shaft 54 is at the position of FIG. 6, the first gap 85 allows the through hole 83 of the first cap 80 and the second gap 86 to communicate with each other. The second gap 86 allows the first insertion hole 46 and the outside (outside of the right side portion of the transmission case 19) to communicate with each other.

Figure 3:
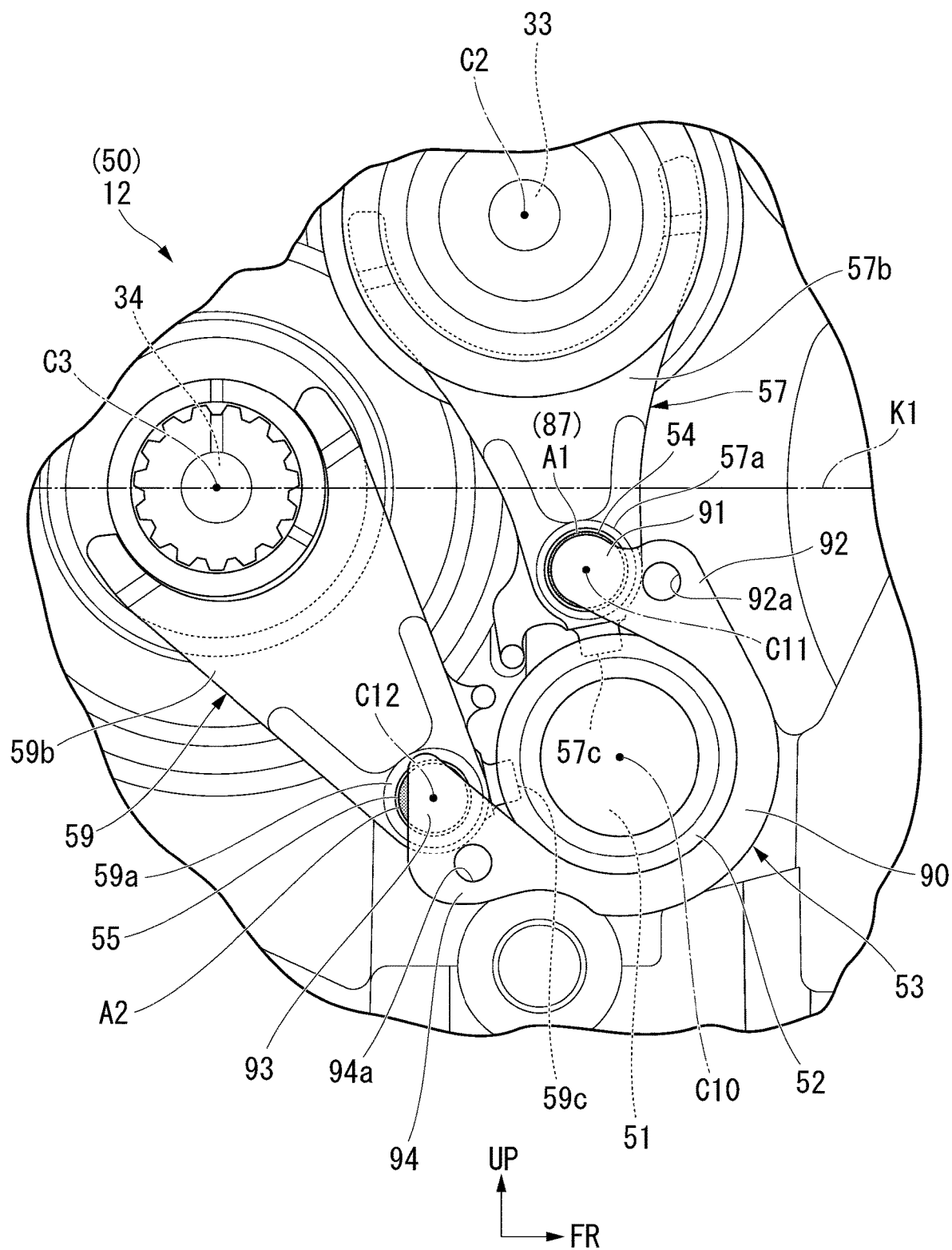
FIG. 3 is a right side view of a surrounding structure of a set member of the embodiment.

As shown in FIG. 3, the set member 53 is formed in a C shape. When viewed in the axial direction, the set member 53 opens to the rear upper side to surround the drum axis C10. The first shaft 54 and the second shaft 55 are provided around the shift drum 51. The set member 53 is disposed to overlap the right end portions of each of the first shaft 54 and the second shaft 55 when viewed in the axial direction. The set member 53 is formed of a single member.

The set member 53 includes a C-shaped portion 90 that forms a C shape surrounding the shift drum 51, a first cover portion 91 that overlaps the right end portion of the first shaft 54 when viewed in the axial direction, a first connecting portion 92 that connects an upper end of the C-shaped portion 90 and the first cover portion 91, a second cover portion 93 that overlaps the right end portion of the second shaft 55 when viewed in the axial direction, and a second connecting portion 94 that connects a lower end of the C-shaped portion 90 and the second cover portion 93.

In the drawing, reference numeral 92a denotes a first through hole through which a shaft portion of a bolt 95 (see FIG. 5) for fixing the first connecting portion 92 to the right side portion of the transmission case 19 is inserted, and reference numeral 94a denotes a second through hole through which a shaft portion of a bolt 96 (see FIG. 5) for fixing the second connecting portion 94 to the right side portion of the transmission case 19 is inserted, respectively. The set member 53 is fixed to the right side portion of the transmission case 19 to restrict the axial position of the bearing member 52 together with the right side portion of the transmission case 19.

When viewed in the axial direction, the first cover portion 91 has a circular arc portion that forms a circular arc shape along an outer shape of the first shaft 54. A third gap 87 communicating with a second gap 86 (see FIG. 6) is formed between the circular arc portion of the first cover portion 91 and the right side portion of the transmission case 19. In FIG. 3, reference numeral A1 denotes a region in which the third gap 87 is formed (hereinafter referred to as a "third gap formation region"). When viewed in the axial direction, the third gap formation region A1 has a circular arc shape along the circular arc portion of the first cover portion 91.

The second cover portion 93 has a triangular shape that protrudes rearward and upward when viewed in the axial direction. A part of the right end portion of the second shaft 55 is exposed from the second cover portion 93 when viewed in the axial direction. In FIG. 3, reference numeral A2 denotes an exposure region of the right end portion of the second shaft 55 (hereinafter referred to as a "second shaft right end exposure region"). When viewed in the axial direction, the second shaft right end exposure region A2 has a semicircular shape protruding rearward.

As described above, the vehicle transmission structure 50 according to the above-described embodiment is equipped with the shift drum 51 that rotates in accordance with the shift operation, the bearing member 52 that rotatably supports the shift drum 51 with respect to the transmission case 19, the set member 53 that positions the bearing member 52, the shift fork shafts 54 and 55 supported by the transmission case 19, and the shift forks 56, 57, 58 and 59 supported by the shift fork shafts 54 and 55 to be movable in the axial direction by the rotation of the shift drum 51. The end portion of the shift fork shaft 54 is movably fitted to the insertion hole 46 provided in the transmission case 19. The cap 80 is provided at the end portion of the shift fork shaft 54. The first gap 85 is provided between the end surface of the insertion hole 46 and the cap 80. The set member 53 is disposed at a position overlapping the insertion hole 46 when viewed in the axial direction. The second gap 86 is provided between the end surface of the insertion hole 46 and the set member 53.

According to this configuration, the first gap 85 is provided between the end surface of the insertion hole 46 and the cap 80, and the second gap 86 is provided between the end surface of the insertion hole 46 and the set member 53. Thus, the following effects are exhibited. When the shift fork shaft 54 moves in the axial direction, since air or oil present in the first gap 85 flows outward through the second gap 86, the axial movement of the shift fork shaft 54 can be promoted. Therefore, a smooth shift operation of the transmission 12 can be performed. In addition, since the set member 53 is disposed at a position overlapping the insertion hole 46 in the axial direction, the position restriction of the shift fork shaft in the axial direction 54 can be performed by the set member 53 common to the positioning of the bearing member 52. This contributes to a reduction in the number of components. In addition, since the cap 80 is provided at the end portion of the shift fork shaft 54, it is possible to suppress occurrence of hitting sound due to a direct collision between the end portion of the shift fork shaft 54 and the set member 53.

In the above embodiment, the transmission case 19 has a structure divided into upper and lower parts constituted by the upper case 19a and the lower case 19b. The shift fork shafts 54 and 55 are disposed in parallel with the mating surfaces of the upper case 19a and the lower case 19b. The right end portion of the shift fork shaft 54 is movably fitted to the insertion hole 46. The first cap 80 is provided at the right end portion of the shift fork shaft 54. The left end portion of the shift fork shaft 55 is fitted to the bottomed boss portion 47 provided in the transmission case 19. The second cap 80 is provided at the left end portion of the shift fork shaft 55. Thus, the following effects are exhibited.

When the shift fork shaft 55 is assembled to the transmission case 19 having a structure divided into upper and lower parts by fitting the left end portion of the shift fork shaft 55 to the bottomed boss portion 47 provided in the transmission case 19, the shift fork shaft 55 inserted from the insertion hole 48 can be easily fixed. In addition, since the insertion hole 48 is blocked by the set member 53, it is possible to easily perform the position restriction of the shift fork shaft 55 in the axial direction. In addition, since the second cap 80 is provided at the left end portion of the shift fork shaft 55, it is possible to suppress occurrence of hitting sound due to a direct collision between the left end portion of the shift fork shaft 55 and the bottom portion of the boss portion 47.

In the above embodiment, the set member 53 is formed in a C shape. A plurality of shift fork shafts 54 and 55 are provided around the shift drum 51. The set member 53 is disposed to overlap the end portions of the plurality of shift fork shafts 54 and 55 when viewed in the axial direction, and is formed of a single member. Thus, the following effects can be exhibited. The position restriction of the plurality of shift fork shafts 54 and 55 in the axial direction can be performed by the single set member 53, which contributes to a reduction in the number of components.

In the above embodiment, since the end portion of the shift fork shaft 55 is exposed from the set member 53 when viewed in the axial direction, the escape of air or oil is further improved.

Modified Example

In the above embodiment, although the example in which the rubber caps 80 are provided at both end portions of the shift fork shaft has been described, the present invention is not limited thereto. For example, a cylindrical rubber member or compression coil spring may be provided as an elastic member between the right end of the shift fork shaft and the set member 53 and between the left end surface of the shift fork shaft and the bottom surface of the recessed portion 45 (the bottom surface of the boss portion 47). Alternatively, a cylindrical rubber member or a compression coil spring may be fixed as an elastic member to the set member 53 and the bottom surface of the recessed portion 45 (the bottom surface of the boss portion 47) to receive the shift fork shaft that moves in the axial direction.

In the above embodiment, although the example in which the caps 80 as the damper members are provided at both end portions of the shift fork shaft has been described, the present invention is not limited thereto. For example, the damper member may be provided in only one of the right end portion (the first end portion) or the left end portion (the second end portion) of the shift fork shaft. That is, the damper member may be provided at least at one end portion of the shift fork shaft.

In the above embodiment, although the example in which the set member 53 is formed in a C shape has been described, the present invention is not limited thereto. For example, the set member 53 may be formed in an annular shape. For example, the set member 53 may have an annular shape surrounding the shift drum 51.

In the above embodiment, although the example in which the set member 53 is formed of a single member has been described, the present invention is not limited thereto. For example, the set member 53 may be formed of a plurality of members.

In the above embodiment, although the example in which a part of the right end portion of the second shaft 55 is exposed from the second cover portion 93 when viewed in the axial direction has been described, the present invention is not limited thereto. For example, the entire right end portion of the second shaft 55 may be covered with the second cover portion 93 when viewed in the axial direction.

In the above embodiment, although the example in which the bottomed boss portion 47 provided in the transmission case 19 seals the side of the left end portion (the space facing the left end portion) of the shift fork shaft 55 has been described, the present invention is not limited thereto.

Figure 7:
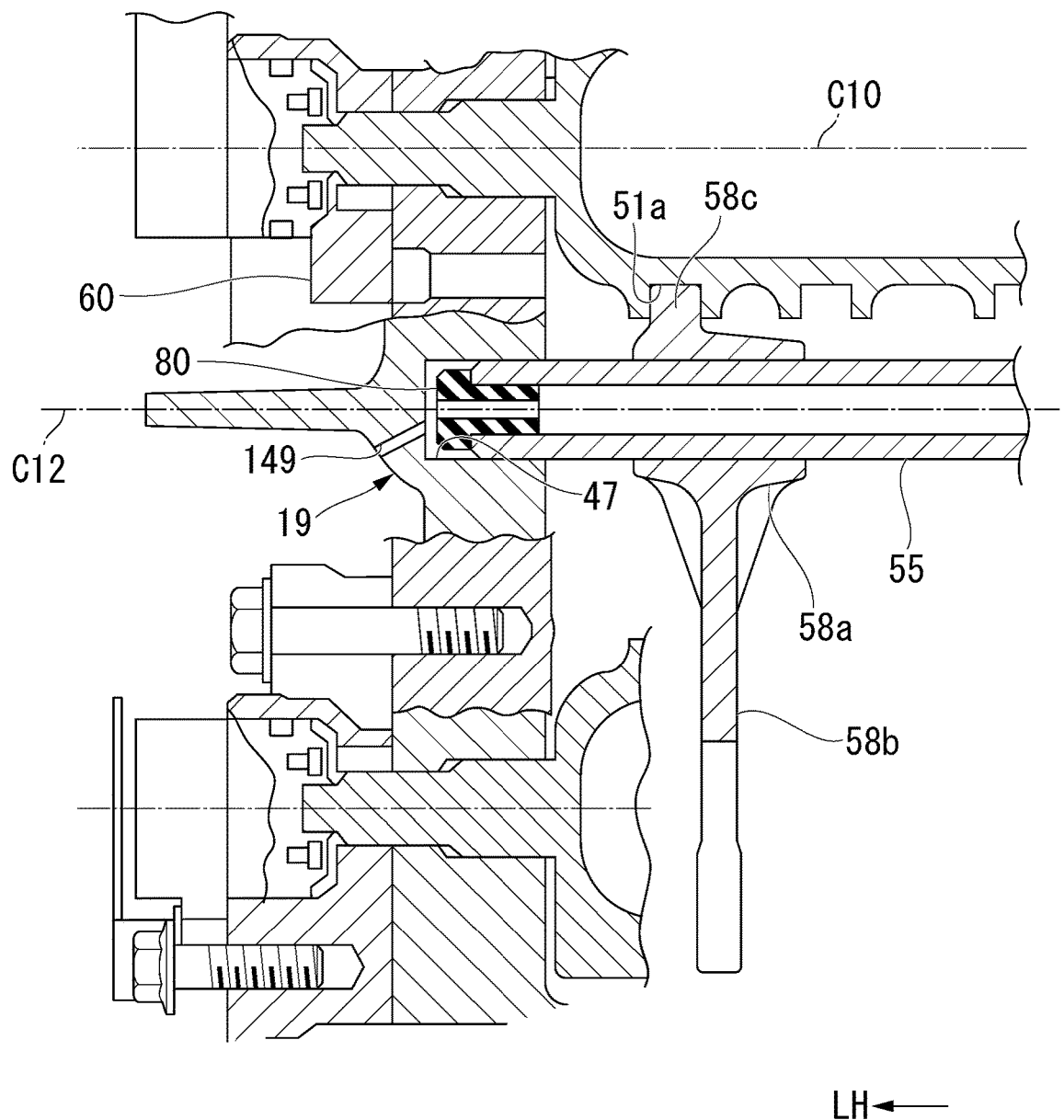
FIG. 7 is a developed cross-sectional view of a vehicle transmission structure according to a modified example of the embodiment.

For example, as shown in FIG. 7, a through hole 149 penetrating a side of the left end portion of the shift fork shaft 55 and the outside of the transmission case 19 may be provided in the bottomed boss portion 47 provided in the transmission case 19.

According to this configuration, when the shift fork shaft 55 moves in the axial direction toward the boss portion 47, since air or oil can be allowed to flow to the outside through the through hole 149, it is possible to further promote the movement of the shift fork shaft 55 in the axial direction.

The present invention is not limited to the above-described embodiment. For example, the saddle riding type vehicle includes all vehicles on which a driver rides across a vehicle body, and includes not only motorcycles (including motorbikes and scooter type vehicles) but also three-wheeled vehicles (also including front two-wheeled and rear one-wheeled vehicles in addition to front one-wheeled and rear two-wheeled vehicles). Further, the present invention is applicable not only to motorcycles but also to four-wheeled vehicles such as automobiles.

Further, the configurations in the above embodiments are an example of the present invention, and various modifications, such as replacing the constituent elements of the embodiments with known constituent elements, can be made without departing from the gist of the present invention.

What is claimed is:

1. A vehicle transmission structure comprising:
   a shift drum which rotates in accordance with a shift operation;
   a bearing member which rotatably supports the shift drum with respect to a transmission case;
   a set member which positions the bearing member;
   shift fork shafts supported by the transmission case; and
   shift forks supported by the shift fork shafts to be movable in an axial direction by rotation of the shift drum,
   wherein an end portion of the shift fork shaft is movably fitted to an insertion hole provided in the transmission case, a damper member is provided at an end portion of the shift fork shaft, a first gap is provided between an end surface of the insertion hole and the damper member, the set member is disposed at a position overlapping the insertion hole when viewed in the axial direction, and a second gap is provided between an end surface of the insertion hole and the set member, and wherein a third gap communicating with the second gap is provided between the set member and the transmission case, the third gap has a circular arc shape when viewed in the axial direction.

2. The vehicle transmission structure according to claim 1, wherein the transmission case has a structure divided into upper and lower parts including an upper case and a lower case, the shift fork shafts are disposed in parallel with mating surfaces of the upper case and the lower case,
- a first end portion of the shift fork shaft is movably fitted to the insertion hole,
- a first damper member is provided at a first end portion of the shift fork shaft,
- a second end portion of the shift fork shaft is fitted to a bottomed boss portion provided in the transmission case, and
- a second damper member is provided at the second end portion of the shift fork shaft.

3. The vehicle transmission structure according to claim 1, wherein the set member is formed in an annular shape or a C shape, a plurality of shift fork shafts are provided around the shift drum, and the set member is disposed to overlap end portions of the plurality of shift fork shafts when viewed in the axial direction, and is formed of a single member.

4. The vehicle transmission structure according to claim 1, wherein the end portion of the shift fork shaft is exposed from the set member when viewed in the axial direction.

5. The vehicle transmission structure according to claim 2, wherein a through hole penetrating a side of the second end portion of the shift fork shaft and the outside of the transmission case is provided in the bottomed boss portion provided in the transmission case.

* * * * *